United States Patent [19]

Babko-Malyi

[11] Patent Number: 6,027,616
[45] Date of Patent: Feb. 22, 2000

[54] EXTRACTION OF CONTAMINANTS FROM A GAS

[75] Inventor: Sergei Babko-Malyi, Butte, Mont.

[73] Assignee: MSE Technology Applications, Inc., Butte, Mont.

[21] Appl. No.: 09/071,621

[22] Filed: May 1, 1998

Related U.S. Application Data

[62] Division of application No. 09/364,999, Aug. 2, 1999.

[51] Int. Cl.$^7$ ........................................................ H05F 3/00
[52] U.S. Cl. ........................... 204/164; 204/177; 204/179
[58] Field of Search ................................... 204/164, 177, 204/179; 422/186.04

[56] References Cited

U.S. PATENT DOCUMENTS

| | | | |
|---|---|---|---|
| 3,702,973 | 11/1972 | Daugherty et al. | 331/94.5 |
| 3,831,052 | 8/1974 | Knechtli | 313/187 |
| 3,883,413 | 5/1975 | Douglas-Hamilton . | |

(List continued on next page.)

OTHER PUBLICATIONS

Tetsuji, O, etal, Nitric Oxide Decomposition in Air by Using Nonthermal Plasma Processing with Additives an Catalyst, IEEE Transactions on Industry, vol. 4, No. 2, Mar./Apr. 1998.

Heath, W., etal., Development and Analysis of high–Energy Corona Process for Air Purification, PNNL–SA–24432, Pacific Northwes Laboratory. No month avilable.

Cummings, M., etal, A Summary of the Cost Effectiveness of Innovative Off–Gas Treatment Technologies, LA–UR–96–1253. No month available.

Sunner,J., etal, "Sensitivity Enhancements obtained at High Temperatures in Atmospheric Pressure Ionization Mass Spectrometry", 1988, Analytical Chemistry. No month available.

Suhr, A., etal, Reduction of Nitric Oxide in Flue Gases by Applying aCorona Discharge with Catalytical Coatings in the Plane Electrode, 1990, pp 101–115. No month available.

Kipp, E., etal, "An Electrochemical Flow Reactir for Oxidation of Hydrocarbon Pollutants", The Canadian Journal of Chemical Engineering, vol. 51, Aug. 1973, pp 494–498.

Green, D., etal, "Characterization of Plasma Proceses in the Destruction of Volatile Organic Compounds", pp 87–99. No month available.

Ohkubo, T., etal, "Time Dependence of NOX Removal Rate by a Corona Radial Shower System" 0–7803–1933–1/94, 1994, IEEE, pp 1570–1582. No month available.

Eliasson, B., etal, "Modeling and Applications of Silent Discharge Plasmas", 0093–3815/94/0400 1991, IEEE, pp 309–322. No month available.

Ruchti, C., etal, "Ablation Controlled Arcs", 0093–3813/86/ 0800–0423, 1986, IEEE, pp 423–434 IEEE Transactions on Plasma Gas vol. PS–14, No. 2 Aug. 1986.

(List continued on next page.)

*Primary Examiner*—Kathryn Gorgos
*Assistant Examiner*—Wesley A. Nicolas
*Attorney, Agent, or Firm*—Peter Tribulski

[57] ABSTRACT

A method of treating industrial gases to remove contaminants is disclosed. Ions are generated in stream of injectable gas. These ions are propelled through the contaminated gas as it flows through a collection unit. An electric field is applied to the contaminated gas. The field causes the ions to move through the contaminated gases, producing electrical charges on the contaminants. The electrically charged contaminants are then collected at one side of the electric field.

The injectable gas is selected to produce ions which will produce reactions with particular contaminants. The process is thus capable of removing particular contaminants. The process does not depend on diffusion as a transport mechanism and is therefore suitable for removing contaminants which exist in very low concentrations.

4 Claims, 5 Drawing Sheets

U.S. PATENT DOCUMENTS

| | | |
|---|---|---|
| 3,891,561 | 6/1975 | Lowther . |
| 3,933,608 | 1/1976 | Haas et al. . |
| 3,970,892 | 7/1976 | Wakalopulos . |
| 3,983,021 | 9/1976 | Henis ............................................ 204/164 |
| 3,984,697 | 10/1976 | Lowther . |
| 4,086,152 | 4/1978 | Rich et al. .................................. 204/176 |
| 4,095,115 | 6/1978 | Orr et al. .................................... 250/538 |
| 4,313,739 | 2/1982 | Douglas-Hamilton ......................... 55/2 |
| 4,416,748 | 11/1983 | Stevens ..................................... 204/157.1 |
| 4,650,555 | 3/1987 | Rzad . |
| 4,657,738 | 4/1987 | Kanter .................................... 422/186.04 |
| 4,695,358 | 9/1987 | Mizuno . |
| 4,774,062 | 9/1988 | Heinemann .............................. 422/186.19 |
| 4,954,320 | 9/1990 | Birmingham et al. ................. 422/186.04 |
| 4,966,152 | 10/1990 | Keough ...................................... 422/181 |
| 5,078,492 | 1/1992 | Fraser . |
| 5,096,054 | 3/1992 | Scherson .................................... 204/101 |
| 5,120,516 | 6/1992 | Ham et al. .................................. 423/235 |
| 5,184,016 | 2/1993 | Ronan et al. ............................... 250/233 |
| 5,236,672 | 8/1993 | Nunez et al. ........................ 422/186.04 |
| 5,279,669 | 1/1994 | Lee .................................. 118/723 MR |
| 5,283,050 | 2/1994 | Gray .......................................... 422/211 |
| 5,284,556 | 2/1994 | Rich ........................................... 204/164 |
| 5,405,514 | 4/1995 | Berman et al. .......................... 204/164 |
| 5,410,871 | 5/1995 | Masters et al. .............................. 60/274 |
| 5,414,324 | 5/1995 | Roth et al. ............................. 315/111.21 |
| 5,458,748 | 10/1995 | Breault et al. ............................. 204/177 |
| 5,460,701 | 10/1995 | Parker et al. ............................. 204/164 |
| 5,490,398 | 2/1996 | Cline ......................................... 662/497 |
| 5,545,379 | 8/1996 | Gray ..................................... 422/186.04 |
| 5,547,643 | 8/1996 | Nomoto et al. ..................... 422/186.04 |
| 5,549,795 | 8/1996 | Gregoire et al. . |
| 5,591,334 | 1/1997 | Shimizu et al. ......................... 210/243 |
| 5,637,198 | 6/1997 | Breault et al. . |
| 5,655,210 | 8/1997 | Gregoire et al. . |
| 5,663,476 | 9/1997 | Cripe . |
| 5,779,991 | 7/1998 | Jenkins ................................. 422/186.21 |

OTHER PUBLICATIONS

Burton, R., etal, "Energy–Mass Coupling in High–Pressure Liquid–Injected Arcs", 0093–3813/9/0400/–0340, IEEE, 1991 pp 340–349, IEEE Transactions of Plasma Science, Apr. 1991.

Heath, etal, "Nonthermal Plasma Technology for Organic Destruction", PNL–SA–25844. No date available.

Urashima, K., etal., "Reduction of NOx from Natural Gas Commbustion Flue Gases by Corona Discharge Radical Injection Techniques", 0093–9994/98510.11, 1998 IEEE, pp. 934–939. No month available.

EXTRACTION OF CONTAMINANTS FROM A GAS

CROSS REFERENCE TO RELATED PATENT APPLICATIONS

This application is a Divisional Application of application Ser. No. 09/364,999, filed Aug. 2, 1993, currently pending, and has common inventorship and ownership with said application.

CONTRACTUAL ORIGIN OF THE INVENTION

This invention was made with United States Government support under Contract No. DE-AC22-96EW96405 awarded by the Department of Energy. The Government has certain rights in this invention.

FIELD OF THE INVENTION

The invention relates to treating industrial gases.

BACKGROUND OF THE INVENTION

There are many industrial processes which produce gaseous waste. Various chemical and mechanical techniques are known and employed to collect noxious components of the gaseous wastes.

Some circumstances arise in which some noxious or toxic components of gaseous waste exist only in very low concentrations. If a component is not particularly dangerous, a waste gas with a low concentration of the noxious substance can be safely released into the atmosphere. In some cases, however, it becomes necessary to reduce an already low concentration of a toxic component to a concentration which is still lower before a safe release can be made. For example, a waste gas may contain a very low concentration of mercury of about 1 ppmv. This concentration of mercury is still too high for safe release into the atmosphere. A concentration at more than two orders of magnitude lower is required to meet present day safety and health standards. This presents an extreme challenge for anyone who is seeking to conduct a cost-effective waste treatment operation.

The concentration of mercury is too high for safe release, but the concentration is too low to permit the use of any conventional chemical extraction techniques. One must resort to expensive and cumbersome multiple pass extraction techniques, in which a waste gas is passed time after time through a collection device as the concentration of mercury is reduced only very slightly during each pass. This requires that a collection system be extremely large or that the process generating the waste is conducted at a slow and uneconomical rate. Neither of these options are desirable.

Another vexing problem occurs when conventional thermal waste treatment systems are used. Introduction of energy needed to raise the temperature of a treated waste gas usually requires the addition of large quantities of mass to the waste gas stream. Typically, this mass addition is in the form of some combustion components such as natural gas and air or oxygen. Thermal systems thus produce an overall increase in the amount of effluent gas emerging from a system. The overall effect of this increase is higher cost and less efficient operation.

This shortcoming of thermal treatment systems has led to attempts at treating waste gases with methods that do not require or produce large scale temperature changes in the treated waste gas. These treatment techniques include such things as electrical non-equilibrium discharge systems. In these systems, there is an attempt to generate free radicals and other chemically active species through electron impact. These active species then destroy pollutant molecules through chemical reactions. Free energetic electrons are created in these prior art systems by pulsed, AC or DC corona, barrier type discharges and electron beam injection. A few examples of such systems are described in U.S. Pat. Nos. 3,983,021 (J. M. Henis) and 4,954,320 (J. G. Birmingham et al.).

These systems perform satisfactorily within certain limits. In many cases the amount of energy which can be applied to purging a gas of pollutants is limited. Electrical discharge systems are efficient only when they operate in a non-arcing mode. In order to operate in such a non-arcing mode, these systems must be operated with low current levels or in a pulsed mode. Because of high spatial non-uniformity of these discharges, one finds that transformation of electric energy into useful chemical reaction is not very efficient. Consequently, it is difficult to transfer large amounts energy into a fast moving stream of waste gas.

In addition to treatment of waste gases, there are other instances in which there is a need to remove or extract contaminants from a gas. For example, in the semiconductor industry, there is a need to provide very high purity silane to particular manufacturing operations. When contaminants within a gas are reduced to levels below a range of a few parts per billion, it becomes very difficult to produce further reductions. However, in some applications it is necessary to reduce contaminants to concentration levels that are two to five orders of magnitude lower than one part per billion.

Prior art purification techniques relied on chemical processes that were dependent on diffusion as a transport mechanism. When extremely low concentrations of an impurity exist, diffusion based chemistry is a very slow process. Consequently, prior art purification systems required complex, multiple stage equipment with large reactor surface areas.

In the prior art, some efforts have been made to achieve purification of waste gases or other industrial gases through use of charged particles. Various types of prior art corona or other discharge devices are used to produce charged particles in applications such as light sources and treatment of surfaces. Some attempts were made in the prior art to apply these devices to removal of impurities from various gases.

In such applications, a desirable feature of any discharge device or system is an ability to convert a large portion of the energy supplied to the system into useful currents of charged particles. Another desirable feature of such systems is that they provide a desired current of charged particles with an application of voltage that is relatively low, so that commonplace dielectric materials can be used for their construction.

Throughout the prior art, an achievement of these design goals has not been fully attained.

In most corona discharge systems, there is a limiting set of operating conditions which, when exceeded, results in formation of arcs and streamers. Typically, arcs and streamers are not a useful form of output energy for these devices.

In order to avoid production of arcs and streamers, prior art discharge systems are operated with relatively low saturation currents. In a typical prior art corona discharge device, a driving voltage of 2500 volts will produce a current of about 0.001 mA. An increase of voltage to 10,000 volts will produce a current that is only about one order of magnitude higher.

Prior art discharge devices produce charged particles of various types. They produce particles such as ions, free electrons and various free radicals. Typically, these particles are produced without any selectivity. In some instances, it is desirable to use particles of a particular type to conduct a process. For example, we have found that some processes such as refinement of gases are most efficiently conducted by using ions.

It is a goal of the present invention to provide a method of producing charged particles with a high ratio of particle current to applied voltage.

It is a goal of the present invention to produce charged particles with a selectivity that provides a predominantly ions.

It is a goal of the present invention to provide a method of treating contaminated gases with a discharge system which permits efficient introduction of energy into a the gas.

It is a further goal of the present invention to provide such a method which has a capability to extract pollutants that are present in the gas in very low concentrations.

SUMMARY OF THE INVENTION

The present invention is directed to a method of extracting selected molecules from a first gas mixture. The method involves generating ions in a second gas mixture comprised of molecules which have an ionization potential that is higher than that of the selected molecules of the first gas mixture. The ionized second gas mixture is injected into the first gas mixture by applying a differential pressure thereto. An electric field is applied to the first gas mixture and the injected ionized second gas mixtures to propel ions through the first gas mixture and to produce interaction between the ions and the selected molecules whereby the molecules become sensitive to the electric field. Application of the electric field is continued to propel the sensitized selected molecules to a collection location.

The invention will be better understood from the following detailed description taken in consideration with the accompanying drawings and claims.

The drawings are not necessarily to scale.

DETAILED DESCRIPTION

Figure 1:
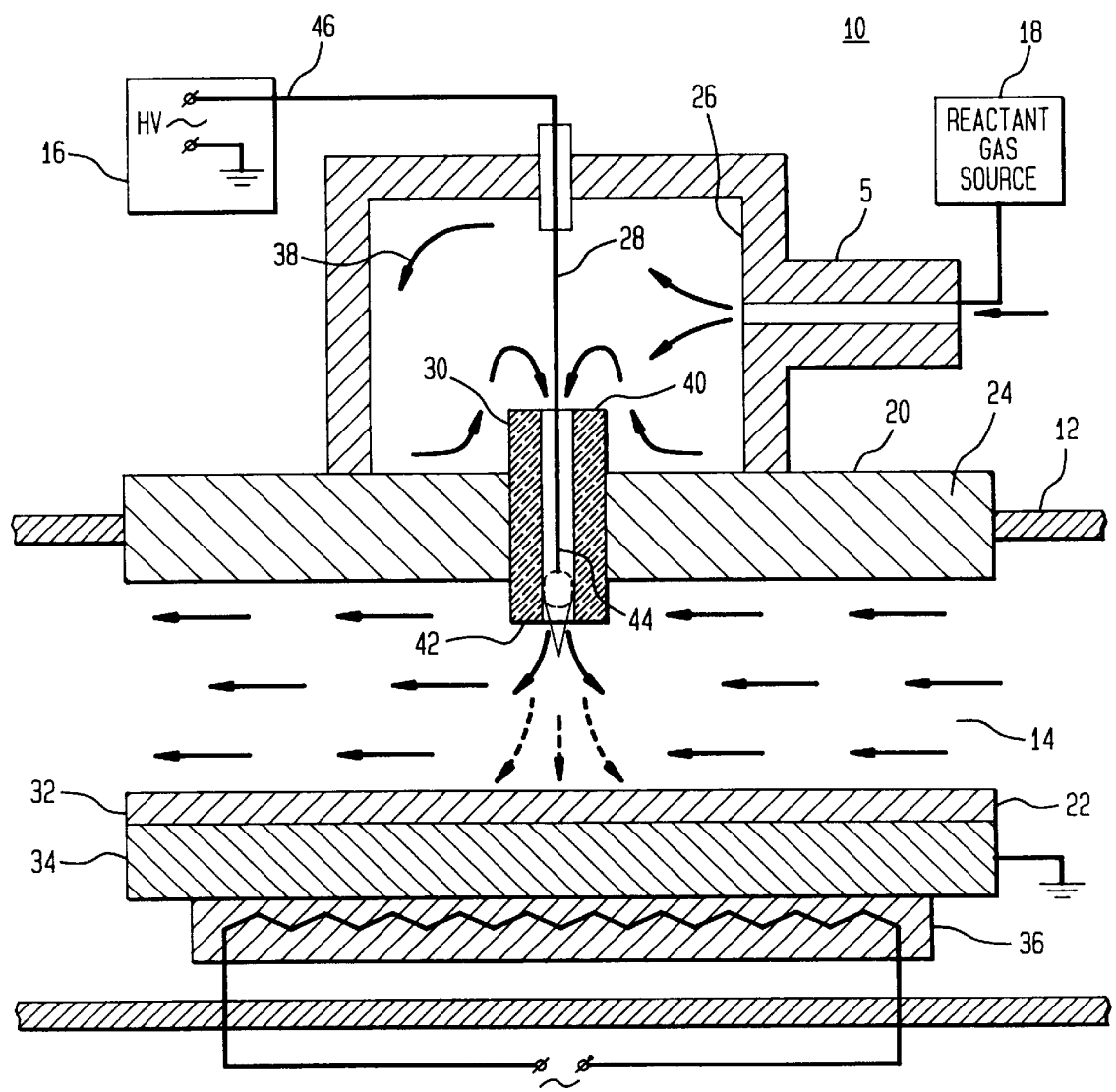
FIG. 1 shows, schematically, a gas treatment unit operated in accordance with the present invention.

Referring now to FIG. 1, there is shown a cross-sectional view of one embodiment of an extraction system which operates in accordance the present invention. An extractor, designated generally by the numeral 10, comprises a passageway 12 through which a contaminated gas 14 flows. The extractor 10 also includes a high voltage power source 16, a reactant gas source 18, an ionization device 20 and a collection unit 22. The ionization device 20 comprises a support plate 24, a chamber 26, a wire electrode 28, and a dielectric tube 30. The collection unit 22 comprises a catalytic surface collector 32, a grounded electrode 34 and a heater 36.

The chamber 26 is filled with a reactant gas 38 from the source 18. Typically, the reactant gas 38 is comprised of a mixture of an inert buffer gas and an active gas. Various examples of the constituents of the reactant gas 38 are described hereinbelow.

The dielectric tube 30 has a first end 40 which is positioned within the chamber 26. The tube 30 has a second end 42 which is positioned within the passageway 12. The source 18 delivers the reactant gas 38 to the chamber 26 at a pressure which is higher than the pressure of the contaminated gas 14 which flows through the passageway 12. This arrangement produces a positive flow of the reactant gas 38 into the contaminated gas 14.

The wire electrode 28 has a free end 44 which is positioned between the first end 40 and the second end 42 of the dielectric tube 30. A second end 46 of the electrode 28 is connected to the power source 16.

The power source 16 applies a potential of up to about 10 kV. to the electrode 28. This results in an electric field developing between the free end 44 of the wire electrode 28 and the grounded electrode 34. The high potential at the electrode 28 produces ions within the reactant gas 38 as the gas flows past the free end 44 of the electrode 28. The electric field developed between the electrodes 28 and 34 causes movement of the ions across the passageway 12 toward the collection unit 22.

It should be noted that the free end 44 of the electrode 28 is positioned sufficiently far away from the passageway 12 so that any ions produced by the ionization device 20 are produced from molecules of the reactant gas 38. Thus the nature of ions produced by the ionization device 20 can be controlled independently from the constituency of the contaminated gas 14.

Figure 2:
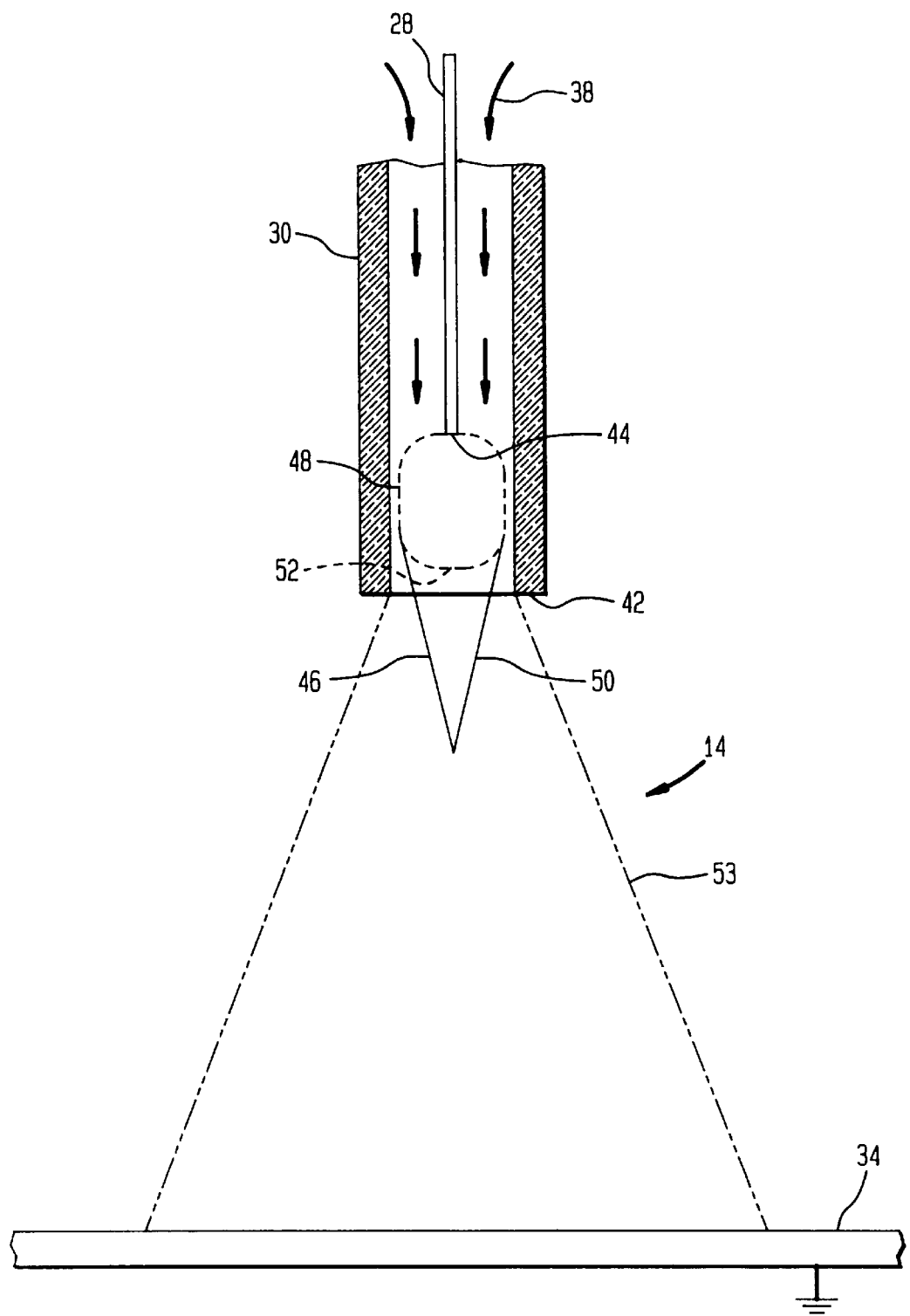
FIG. 2 is an enlarged partial sectional view of a portion of the apparatus of FIG. 1.

A more clear understanding of this feature of the present invention can be had by referring to FIG. 2. FIG. 2 shows a partial sectional view of the dielectric tube 30 and a portion of the wire electrode 28. An energy transfer region 46 is shown developed around the free end 44 of the electrode 28.

This energy transfer region 46 is a region of space in which electrical energy from the power source 16, of FIG. 1, is converted to ionization and excitation of atoms and molecules of the reactant gas 38. Electron avalanches start to develop in this region 46. The region 46 is divided into two sub-regions 48 and 50 with a dashed line 52. The sub-region 48 represents a region in which a majority of the energy conversion produces ionization of the reactant gas mixture 38. The sub-region 50 represents a region in which most of the energy conversion produces excitation of atoms. It should be noted that the sub-region 48 does not extend beyond the first end 42 of the dielectric tube 30. Consequently, virtually all of the production of ions occurs within the dielectric tube 30 and within a stream of the reactant gas 38.

A region 53, designated with dashed lines, is an ion-drift region in which reactive processes occur between reactant ions formed in the mixture 38 and impurities in the gas mixture 14.

The type and shape of the discharge portrayed in FIG. 2 has not been observed in prior art systems. In a typical prior art point-to-plane corona discharge, the ionization region is not as stable, large and intense as the region 46 of the present invention.

It has been found that the present invention can be practiced successfully by employing the following parameters. A quartz capillary with an internal diameter of about 0.37 mm is used as the dielectric tube 30. A copper wire having a diameter of about 0.25 mm is used as the electrode 28. The free end 44 of the wire electrode 28 is positioned about 4 mm from the first end 42 of the dielectric tube 30. The free end 44 of the electrode 28 is positioned about 21 mm from the grounded electrode 34. With a 200 ppmV Toluene with air balance as the reactant gas 38, a voltage of about 8 kV applied to the electrode 28 produces a current in excess of 100 $\mu$A. When Helium is used as the reactant gas 38, currents in excess of 4 mA are attained.

By way of comparison, it should be noted that conventional point-to-point corona discharge systems require higher onset voltage. Furthermore, these conventional corona discharge systems produce currents which are two to three orders of magnitude lower than those achieved by employing the present inventive method.

Conventional corona discharge systems typically experience slight increases in current flow when applied potential is increased. However, a great increase in potential produces arcing and a consequent destruction of the corona discharge. Typically, this arcing or breakdown voltage is reached long before conventional corona current can be driven to a level equal to that attainable with the present inventive technique.

Figure 3:
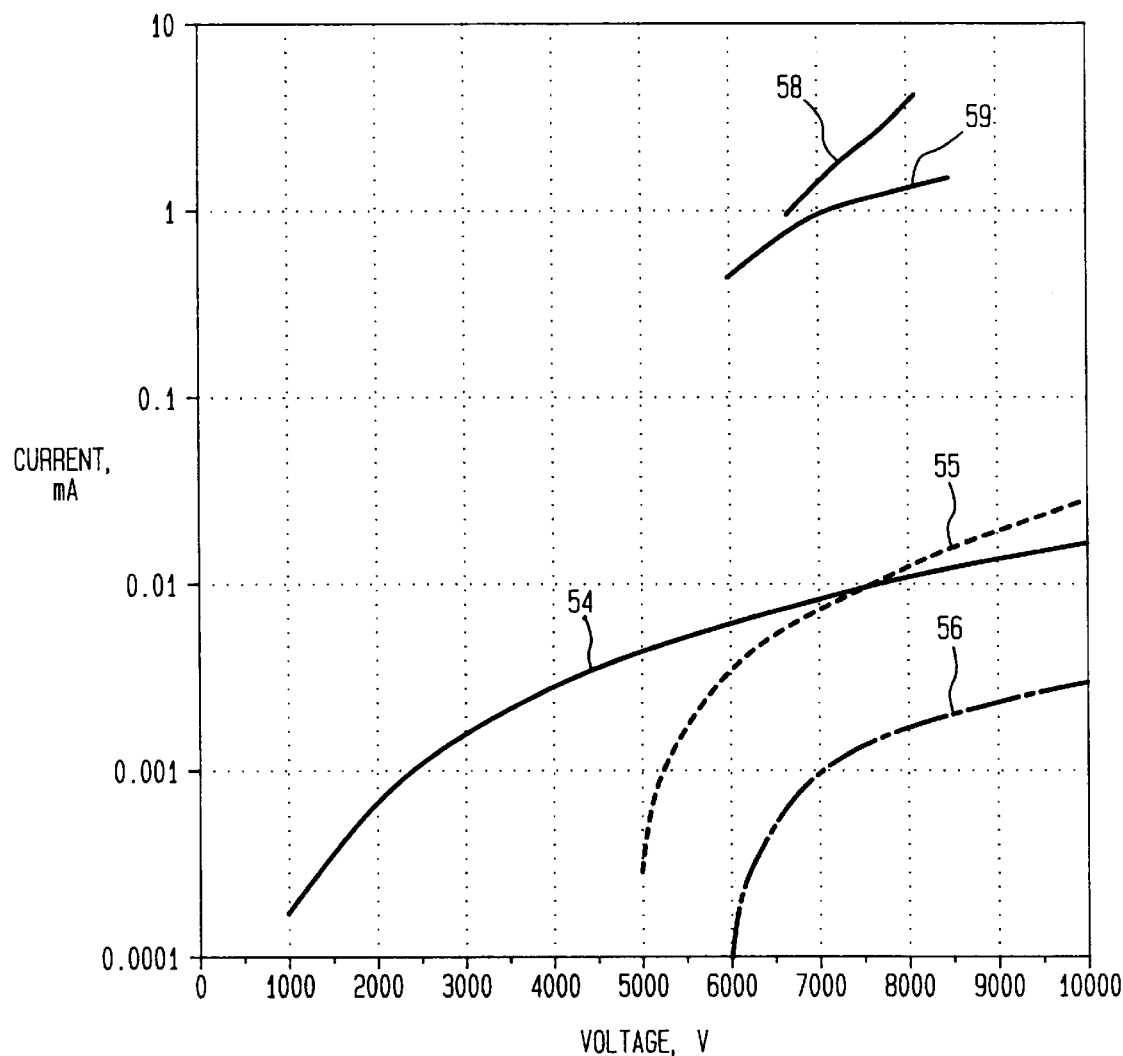
FIG. 3 is a chart showing a relationship of operating parameter of the present invention compared with the prior art.

Referring now to FIG. 3 there is shown a comparison of voltage and current relationships for conventional corona discharge and the subject inventive discharge system. A solid graph line 54 illustrates a theoretical saturation current limit for a typical point-to-plane corona discharge system. A dashed line 55 shows a relationship between voltage and current determined experimentally in which a conventional point-to-plane corona discharge occurs with a 13 mm gap in air at atmospheric pressure. A dashed line 56 shows a relationship between voltage and current determined experimentally in which a conventional point-to-plane corona discharge occurs with a 20 mm gap in air at atmospheric pressure.

A graph line 58 shows a relationship between current and voltage when operating the present invention in an AC mode with Helium as the reactant gas 38 and air as the first gas 14 at atmospheric pressure. A graph line 59 shows a relationship between current and voltage when operating the present invention in a DC mode with Helium as the reactant gas 38 and air as the first gas 14 at atmospheric pressure.

The present inventive technique produces these comparatively high currents due to several stabilization effects which do not develop in conventional point-to-plane corona discharge systems. A key attribute of the present invention is a use a dielectric enclosure confining a high field electrode and a flow of reactant gas around the high field electrode.

As shown in FIG. 2, the ionization region 48 is located inside the dielectric tube 42 and inside a flow of the reactant gas 38. The inventive discharge only exists when there is a positive flow of the reactant gas 38 through the tube 42. In an absence of flow, the current is very low.

Conditions for ionization are more favorable in the region 48 than in the regions outside the tube 42. One of the reasons for this is a presence of easily ionized compounds in the reactant gas 38. Another reason is that the flow of the gas mixture 38 rapidly removes generated ions from the region 48 because the ions are heavy enough to be carried away with a moving gas. Removal of ions from the region 48 simultaneously increases the injection rate of ions into the drift region 51.

Still another reason for discharge stability is the presence of the dielectric tube 42. The tube 42 concentrates the field adjacent the free end 44 of the electrode 28 so that the comparatively large region 48 has a high field strength that abruptly decreases outside the tube 42. In a conventional corona system, the high field region is very small and the field decreases gradually.

The tube 42 also has the effect of cooling electrons in the ionization region 48. This prevents early transition of a discharge into a filament arc mode. In contrast, in a conventional system, initial streamers easily convert into filamentary arcs.

In prior art applications of corona discharge, development was directed to optimizing use of radicals produced in the discharge process. Many prior art techniques have been studied and devised which employ radical exchange chemistry as a mechanism for selectively removing certain molecules form a gas stream. See for example "Time Dependence of $NO_x$ Removal Rate by a Corona Radical Shower System", Ohkubo, Kanazawa, Nomono, Chang and Adachi, IEEE 0-7803-1993-1/94, 1994. pp. 1570–1582.

However, use of radical chemistry in this context, is subject to the constraining laws of diffusion. As a concentration of a selected molecule is made lower, the rate of the radical chemical process aimed at those molecules becomes correspondingly slower. Indeed, there are many instances in which rates of reaction may reduce exponentially with reductions in concentrations of the selected molecules.

A much more desirable rate of extraction of low concentrations of selected molecules can be achieved when ions are employed as agents of change for the selected molecules. When an ion is used to effect a change on a selected molecule, the molecule typically is left in a electrically charged condition. Such molecules can be transported readily to a collection location through a driving force of an electric field. Additionally, ions entering a contaminated gas can be readily driven through that gas by the same electric field. Thus, neither the selective modification of molecules or the collection of the modified molecules is dependent on the laws of diffusion.

Reaction rates and extraction rates are increased by orders of magnitude when ions are used as a transport medium. This concept has not heretofore been used in the context of extraction of pollutants from waste gases or in refinement of gases such as silane. Prior to the present invention there has been no practical way to produce ions on a sufficient scale to be useful in these extraction systems. Indeed, the generation of ions in prior art discharge systems has been limited to laboratory scale systems in which a discharge is produced in near vacuum conditions.

The present invention provides a heretofore unavailable system for producing ions in sufficient quantities to permit practical use of ions as a reaction and transport mechanism in gases at atmospheric pressure. It should also be recognized that the present invention provides a heretofore unavailable opportunity to achieve selectivity in the types of ions which are used to perform extractions of pollutants or contaminants. Thus an extraction system operating in accordance with the present invention is doubly effective in purging gases of pollutants and contaminants which are present in low concentrations.

Selectivity of ions is achieved by choosing the constituency of the reactant gas 38. Because the ionization device 20 of FIG. 1 produces ions only from the reactant gas 38, the ions can be produced with a selected ionization potential or other selected properties. This feature is very useful in the extraction of pollutants and contaminants with low concentrations.

Application of this feature of the present invention can be better understood when considering the following example related to extraction of pollutants from a waste gas that consists of $CO_2$, air ($N_2$ and $O_2$), $NO_x$ and mercury. The extraction system 10 of FIG. 1 can be used to effectively purge this type of waste gas of $NO_x$, mercury and dioxins.

Extraction is performed in two stages. In a first stage one of the extraction systems 10 is operated with helium and oxygen as the reactant gas mixture 34. Helium has an ionization potential of 24.5 eV and oxygen has an ionization potential of 12.06 eV. Therefore primarily $O_2^+$ ions are generated in the ionization region 52. Ionization potential of oxygen is higher than that of NO, $NO_2$ and mercury but lower than that of nitrogen and $CO_2$. Consequently, the oxygen ions in the first stage react with and sensitize the NO, $NO_2$ and mercury. However, NO and $NO_2$ molecules have ionization potentials which are lower than that of mercury. Thus most of the mercury which become sensitized will give up its charge to NO and $NO_2$ molecules. The first stage of this extraction process therefore provides for an extraction primarily of $NO_x$.

Waste gas leaving the first of a such a two stage system will consist of $CO_2$, air, mercury, dioxins and a trace amount of $NO_x$ compounds. In a second stage, the extraction system 10 is operated with a combination of carbon dioxide and a halogenated hydrocarbon such as carbon tetrachloride (100:1 to 1000:1 ratio) in a negative mode. Carbon dioxide is very effective in electron thermalization and this facilitates generation of negative chlorine ions based on carbon tetrachloride dissociation. Negative chlorine ions in this case are the reactant ions. Nitrogen, oxygen, carbon, carbon dioxide and nitrogen oxides have lower electron affinities than chlorine and cannot detach electrons from the negative chlorine ions. At the same time, negative chlorine ions can easily attach to complex and large electronegative molecules such as dioxin and furan. Formed clusters of negative ions remain sensitized as they are propelled through the electric field. As they travel, they grow by adding other electronegative molecules. Mercury also readily forms mercuric chloride negative ions combining with negative chloride ions.

In this way, mercury and mercuric compounds become sensitized and are driven to the collection unit 22 by the electric field.

Since mercuric compounds and polychlorinated dibenzodioxins/furans are soluble in water, a water based electrolyte can be used in a collection unit to gather these compounds. This type of collection unit is described in detail hereinbelow and is illustrated in FIG. 5.

Figure 4:
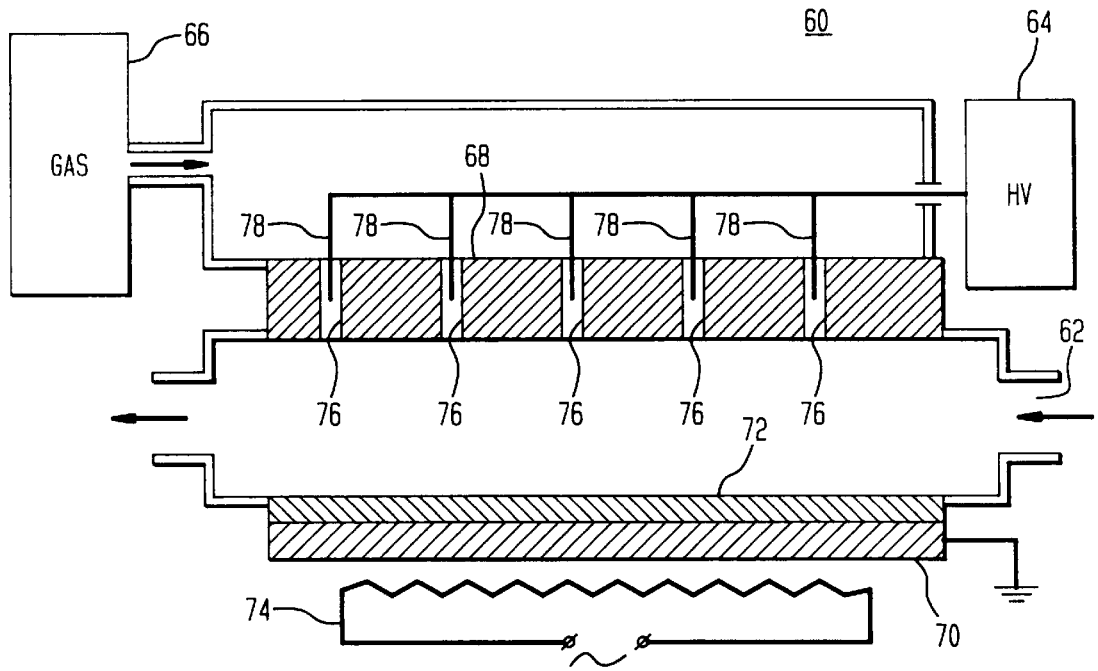
FIG. 4 is a schematic, partial sectional view of an apparatus for practicing the present invention which has multiple ion generators.

Referring now to FIG. 4, there is shown, schematically, an extraction unit 60 constructed and operated in accordance with the present invention. The unit 60 is comprised of a waste gas passageway 62, a high voltage power supply 64, a reactant gas source 66, a dielectric plate 68, a grounded electrode 70, an adsorber element 72 and a heater 74. The dielectric plate is provided with a series of cylindrical holes 76 which conduct reactant gas from the source 66 into the passageway 62. An electrode 78 extends into each of the holes 76. Each of the electrodes 78 is connected to the high voltage power supply 64.

Within this extraction unit 60 each of the holes 76 acts as a high voltage ionization unit in the manner described in connection with the ionization unit 22 of FIG. 1 hereinabove. As waste gas passes through the passageway 62, it passes across an extensive collection of ionization units and it passes across an extensive surface area of the adsorber element 72. It can be seen that there need be no limit to the length of the passageway 62. Consequently the extraction unit 60 can be configured to provide an unlimited range of flow rates and residence times chosen to accommodate a wide range of waste gas treatment scenarios. For example, the extraction unit 60 can be effectively applied to removal of unburned organics which can be catalytically oxidized and adsorbed.

Figure 5:
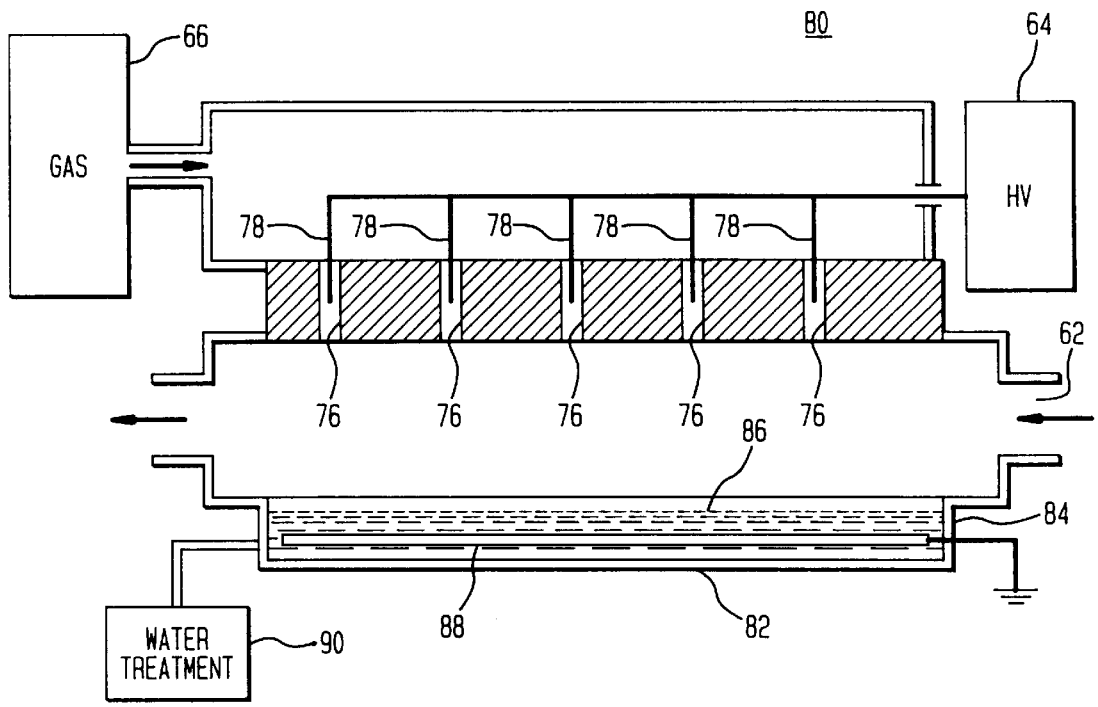
FIG. 5 is a schematic, partial sectional view of another apparatus for practicing the present invention which has multiple ion generators.

Referring now to FIG. 5 there is shown an extraction unit 80 constructed and operated as another embodiment of the present invention. The extraction unit 80 is similar to the extraction unit 60 of FIG. 4 in all respects except that a collection unit 82 is configured to operate in a scrubber mode. The collection unit 82 is comprised of a tank 84 filled with a collection fluid 86. A grounded electrode 88 is immersed in the fluid 86. The tank 84 is connected with a conventional fluid treatment unit 90.

Waste gas which contain substances such as mercury can be very effectively treated with the extraction unit 80 because, as described above, the present inventive method transforms mercury into water soluble substances. Additionally, the unit 80 is effective in removal of other compounds which can be destroyed or bonded using liquid phase reactions. Such compounds include nitrogen oxides and dioxins as well as mercury.

In contrast to conventional scrubbers, the unit 80 does not rely on solubility of the pollutant in a scrubber liquor. Therefore, the concentration of the pollutant can be very high in the liquor. This facilitates a simplification of scrubber blowdown treatment.

Figure 6:
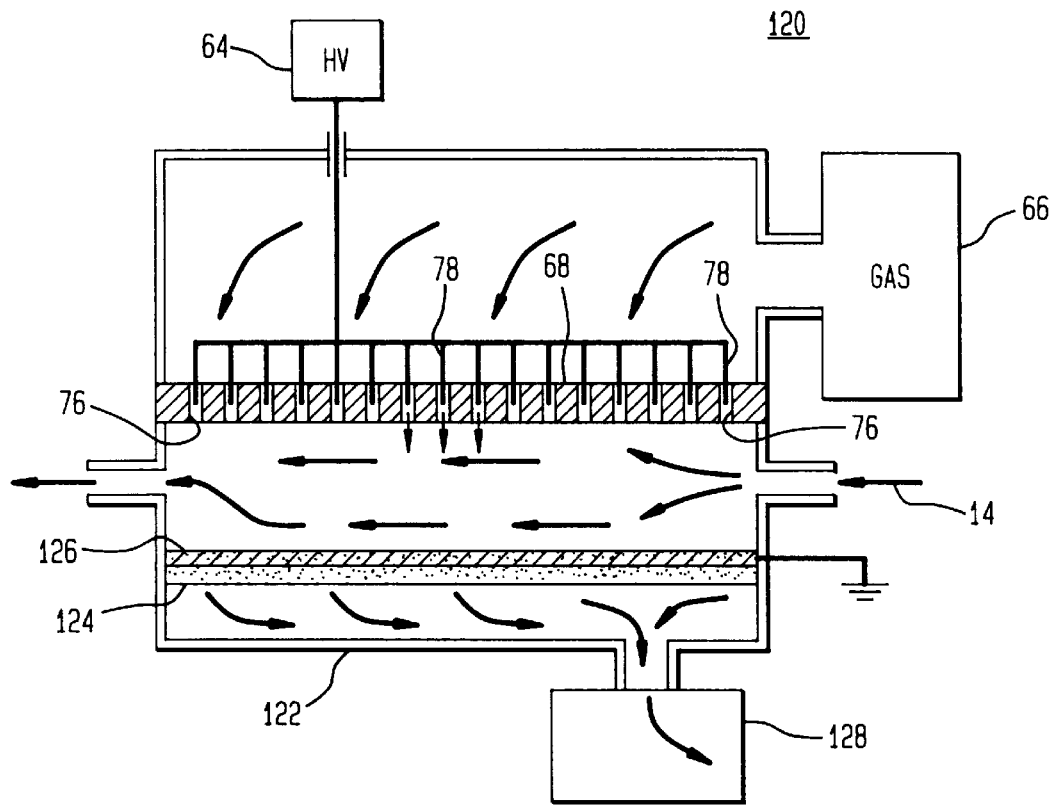
FIG. 6 is a schematic, partial sectional view of another apparatus for practicing the present invention which has multiple ion generators.

Referring now to FIG. 6, there is shown an extraction unit 120 constructed and operated as another embodiment of the present invention. The extraction unit 120 is similar to the extraction unit 60 of FIG. 4 in all respects except that a collection chamber 122 is configured to operate in a membrane separator mode. The collection chamber 122 is comprised of a semipermeable membrane 124 and a porous electrode 126. The contaminated gas 14 is pumped from an area adjacent an electrode 126 through the membrane 124 into the collection chamber 122. Then the gas which passes through the membrane 124 is pumped to a conventional treatment unit 128. This configuration works well as a preconcentrator. It concentrates the pollutant into a significantly smaller volume of gas. This of, course raises the concentration of the pollutant and thus facilitates treatment with conventional techniques.

Figure 7:
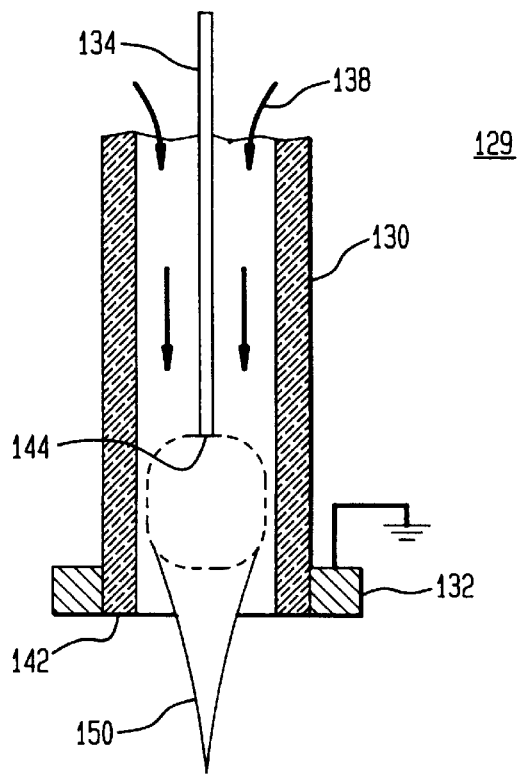
FIG. 7 is a partial sectional view of an ion generator operated in accordance with the present invention.

Referring now to FIG. 7, there is shown another embodiment of an apparatus 129 useful to practice the present invention. A dielectric tube 130 is surrounded with a grounded ring electrode 132. A wire electrode 134 is positioned concentrically within the tube 130 with a free end 144 of the electrode 134 being recessed from a free end 142 of the tube 130. A reactant gas 138 flows through the tube 130 and passes through an electric field that is developed by producing a difference in potential between the ring electrode 132 and the wire electrode 134.

The apparatus 129 produces a plasma plume 150. It can be used to inject plasma into ambient air or other gas. The apparatus 129 can be employed to produce plasmas which are useful in applications such as sources of light, surface treatment and mass spectrometer ion sources.

The apparatus 129 is particularly useful in applications which require that low temperature plasma is injected into space in which additional electrodes can not be placed.

Conventional plasma generation devices have various shortcomings for plasma-chemical applications. Microwave and radio frequency discharge devices produce high-temperature equilibrium plasma which cannot be applied for selective gas treatment or surface treatment.

These examples illustrate the principle that the present invention can be used to effectively treat many different types of gases through proper selection and combination of stages and reactant gases. Each reactant gas mixture can be selected to have a component with an ionization potential slightly higher than that of the molecules of the waste which are targeted for extraction.

It is to be appreciated and understood that the specific embodiments of the invention are merely illustrative of the general principles of the invention. Various modifications may be made by those skilled in the art which are consistent with the principles set forth.

What is claimed is:

1. A method for extracting selected molecules from a first gas mixture, which comprises the steps of:

generating ions, by electrical discharge, in a second gas mixture comprised of molecules which have an ionization potential that is higher than that of the selected molecules of the first gas mixture;

injecting the ionized second gas mixture into the first gas mixture by applying a differential pressure thereto;

applying an electric field to the first gas mixture and the injected ionized second gas mixture to propel ions through the first gas mixture and to produce interaction between the ions and the selected molecules whereby the molecules become sensitive to the electric field;

continuing to apply the electric field to the first gas mixture to propel the sensitized selected molecules to a collection location; and collecting a concentration of the selected molecules at the collection location and removing them from the first gas mixture.

2. The method of claim 1 wherein the electric field is held in a fixed location and the first gas mixture flows continuously through the electric field.

3. The method of claim 2 wherein the first gas mixture flows at about atmospheric pressure.

4. A method of reducing mercury contamination from a waste gas that contains nitrogen oxides, which method comprises the steps:

generating ions, by electrical discharge, in a first gas mixture comprised of helium and oxygen;

injecting the ionized first gas mixture into the waste gas by applying a differential pressure thereto;

applying an electric field to the waste gas and the injected ionized first gas mixture to propel $O_2^+$ ions through the waste gas and to produce interaction between the ions and the selected molecules whereby the molecules of the nitrogen oxides become sensitive to the electric field;

continuing to apply the electric field to the first gas mixture to propel the sensitized nitrogen oxide molecules to a collection location;

propelling the remaining waste gas to a second stage of an extraction operation;

generating ions in a second gas mixture comprised of a halogenated hydrocarbon and carbon dioxide;

injecting the ionized second gas mixture into the remaining waste gas by applying a differential pressure thereto;

applying an electric field to the remaining waste gas and the injected ionized second gas mixture to propel negative chlorine ions through the remaining waste gas and to produce interaction between the ions and the selected molecules whereby the molecules of the mercury and mercuric compounds become sensitive to the electric field; and continuing to apply the electric field to the remaining waste gas to propel the sensitized mercury and mercuric compounds to a collection location; and collecting a concentration of the mercury and mercuric compound molecules at the collection location and removing them from the first gas mixture.

* * * * *